ns Patent [19]

Cowardin et al.

[11] 4,086,477
[45] Apr. 25, 1978

[54] DECODING METHOD AND CIRCUIT
[75] Inventors: Robert Lewis Cowardin, Cary; George Joseph Laurer, Raleigh, both of N.C.
[73] Assignee: International Business Machines Corporation, Armonk, N.Y.
[21] Appl. No.: 809,966
[22] Filed: Jun. 27, 1977
[51] Int. Cl.² .......................... G06K 7/10; G06K 9/04
[52] U.S. Cl. .............................. 235/464; 340/146.3 Z
[58] Field of Search .................... 250/566, 568, 569; 235/61.11 E, 61.11 D, 61.7 R, 61.9 R, 61.12 N; 340/146.3 K, 146.3 Z; 360/24

[56] References Cited
U.S. PATENT DOCUMENTS

| 3,784,792 | 1/1974 | Dobras | 340/146.3 Z |
| 3,811,033 | 5/1974 | Herrin | 235/61.11 E |
| 3,959,625 | 5/1976 | Kashio | 340/146.3 Z |
| 3,961,164 | 6/1976 | Reed | 235/61.12 N |
| 4,000,397 | 12/1976 | Hebert | 235/61.11 E |

Primary Examiner—Robert M. Kilgore
Attorney, Agent, or Firm—John B. Frisone

[57] ABSTRACT

A method and circuit for decoding coded electric signals from a scanner reading a coded label such as the Universal Product Code (UPC) label, establishes a plurality of counting gates based on a predetermined sequence of discrete signal transitions and counts a plurality of related pulse frequencies during the gating periods under control of the established counting gates. The counts are compared in a predetermined sequence to determine the relationship between their magnitudes (e.g., $A < B$; $A > B$) and a coded signal generated indicative of the relationship. The said coded signals indicate the value of the coded information.

7 Claims, 7 Drawing Figures

DECODING METHOD AND CIRCUIT

BACKGROUND OF THE INVENTION

1. Field of the Invention

The invention relates in general to detecting framing and decoding coded electric signals and more particularly to detecting, framing and decoding coded electric signals derived from scanning a Universal Product Code (UPC) label with an opto-electric scanner which produces electric signals which are an analog of the optical bar coded label.

2. Description of the Prior Art

The UPC coded label and similar coded labels have dimensional optical characteristics which define with precision the coded information in the label in a form suitable for use in a data processing system. All that is required in order to decode the information is knowledge of the dimensional characteristics and a known algorithm which defines calculations which will yield the information in usable form. For example, a UPC label is provided with two guard bars (areas of lower reflectivity separated from each other and from adjacent areas of similar reflectivity by spaces, areas of higher reflectivity). The dimensions of the spaces and guard bars are selected as to differ sufficiently from the bars and spaces defining the coded information so as to indicate the beginning of the coded information. The coded information is contained on a character basis in two bars and two spaces occupying a fixed space. Twelve characters divided into two groups of six separated by a unique separator character comprise a label.

An absolute measurement of the bar and space widths when a hand-driven scanner is used is impossible since the velocity of the scanner is unknown and subject to wide variation. The code, however, may be located, framed and decoded by calculating selected ratios. These calculations, however, require arithmetic units which, when provided for this function only, are economically burdensome.

SUMMARY OF THE INVENTION

The invention contemplates a method for decoding a coded label in which a signal which is the analog of the coded label is available and comprises the steps of: generating a plurality of pulse trains of different predetermined related frequencies, generating a plurality of gating signals as a function of selected transitions in the signal which is the analog of the coded label, gating the various pulse trains of different predetermined frequencies to a plurality of counters by predetermined gating signals; comparing the counted values in a predetermined sequence, and storing the results of the comparison which stored results represent the coded information on the label.

DESCRIPTION OF THE PREFERRED EMBODIMENT

Figure 1:
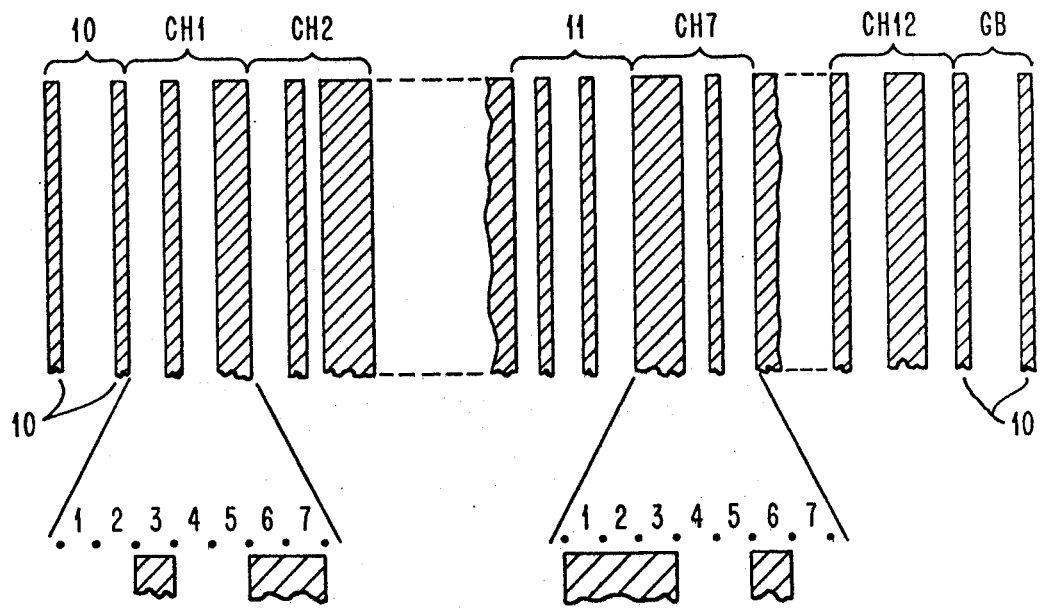
FIG. 1 is a graphical representation of a coded label such as a UPC coded label.

The UPC label, one of which is partially illustrated in FIG. 1, includes two guard bars 10 at each end, a center separator 11 having three spaces and two bars and six characters between the left guard bars and the center separator and another six characters between the center separator 11 and the right pair of guard bars. Each character has seven time slots and includes two bars and two spaces. The sum of the black or dark slots on the left side characters is odd and the sum of the black or dark slots on the right side characters is even. The left and right side characters are from different sets and have different parity (e.g., odd/even) as described above. These characteristics have been published and are well known; however, they have been reviewed here to enhance an understanding of the invention which is described below.

The actual width of the label and the time slots is subject to considerable variation. In addition, the velocity of scan is not easily controlled in a hand-propelled environment. Thus, absolute measurements of the bar and space widths is of little or no value in decoding the information encoded in a label. There are, however, certain ratios which are not subject to velocity or size variations which when computed will yield the coded information.

Figure 2:
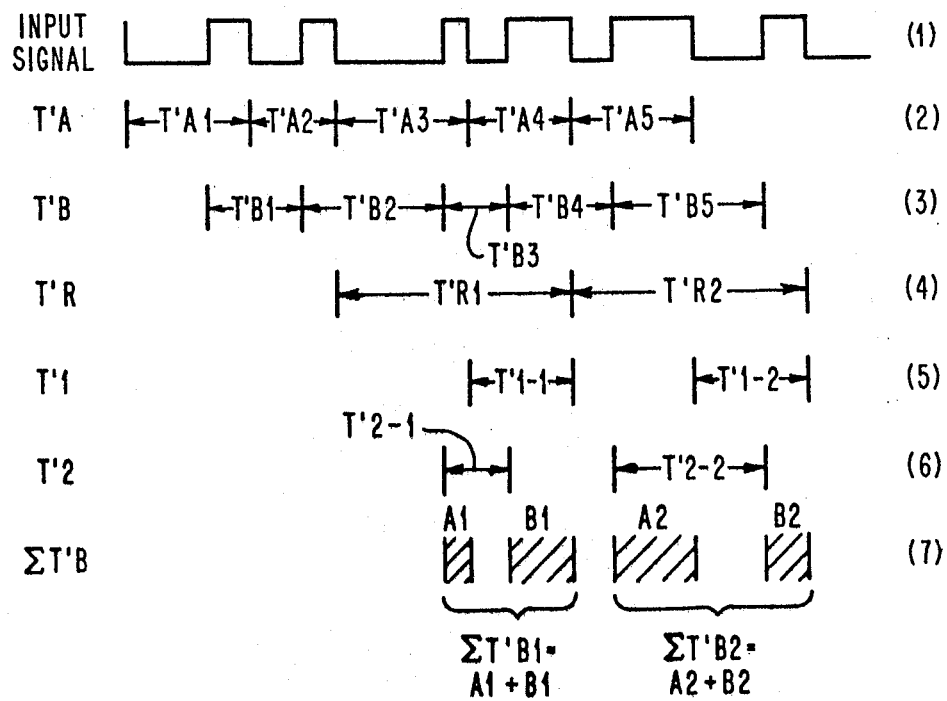
FIG. 2 is a graphical representation of an electric signal derived when a label is scanned by an opto-electric scanner and includes a graphic representation of the various time periods within the coded signal.

Before describing these ratios, it is necessary to define certain measurements used. In FIG. 2 the graph on line (1) is a representation of an electric analog of a portion of a UPC label as described above. The positive pulses correspond to the black or dark parts of the label. The remaining illustrations define portions of the input signal on line 1.

T'A, line 2, represents time or distance between adjacent trailing edges (negative transitions) in the input signal. T'B, line 3, represents time or distance between leading edges (positive transitions) in the input signal. T'R, line 4, represents the time or length of each character in the input signal. T'1 and T'2, lines 5 and 6, represent, respectively, the time or distance between the trailing edge of the first character bar and the trailing edge of the last character bar, and the time or distance between the leading edge of the first character bar and the leading edge of the last character bar. $\epsilon T'B$, line 7, is a replica of the positive portion of the input signal. The shaded areas equal the time or length of black areas in each character.

Based entirely on the characteristics of the UPC code and the values of T'1, T'2, T'R and $\epsilon T'B$, three equations may be solved to yield those values N1, N2 and N3 which in combination uniquely define all of the codes in both code sets of the UPC code. The three equations which require solution are set forth below:

$$N_1 \pm e_1 = \frac{7T'1}{T'R} \qquad 1)$$

$$N2 \pm e_2 = \frac{7T'2}{T'R}, \text{ and} \qquad 2)$$

$$N3 \pm e_2 = \frac{7\epsilon T'B}{T'R} \qquad 3)$$

In the above equations, the ± error components $e_1$ and $e_2$ result solely from acceleration or deceleration of the scanner. Taking into consideration the geometry of the code and human capabilities, these errors are not so great as to represent a disabling error source. Furthermore, the code has built within it means for deleting erroneous reading, thus providing the means for requesting a rescan. The error component $e_3$ is subject to a spread error in addition to the deceleration error described above. The spread error is introduced by measuring adjacent edges of the bars which, for example, may change dimensions as a function of the amount of ink or print pressure used. In the case of $e_1$ and $e_2$ the measurements are made between corresponding edges which are displaced equally and in the same direction, thus eliminating this type of systematic error.

The straightforward solution of the above equations is not difficult; however, in many instances it may be unduly expensive since it requires arithmetic computation capability which may not be needed for any other reason.

Figure 3:
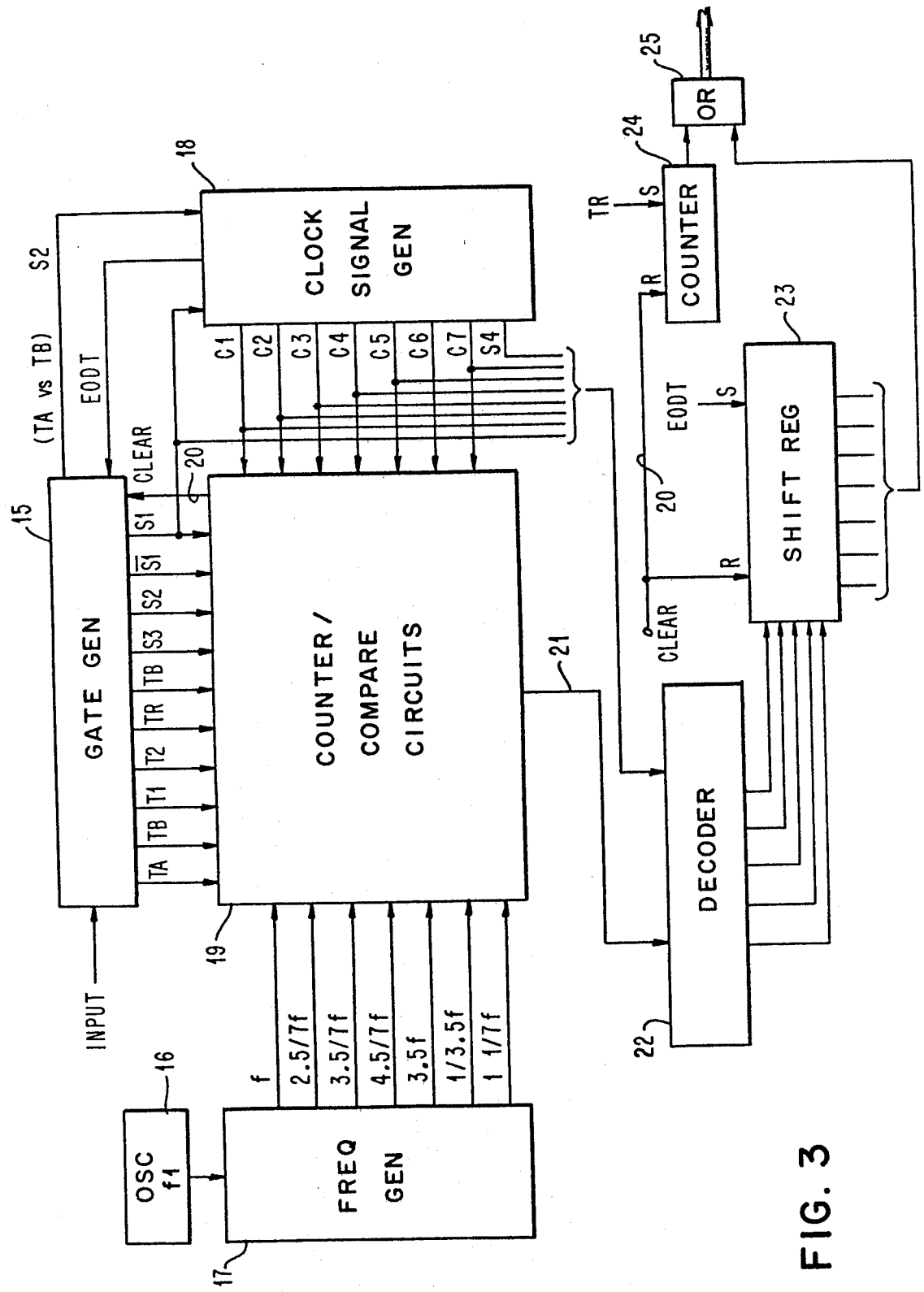
FIG. 3 is a block circuit diagram of a detector-decoder constructed according to the invention.
Figure 4:
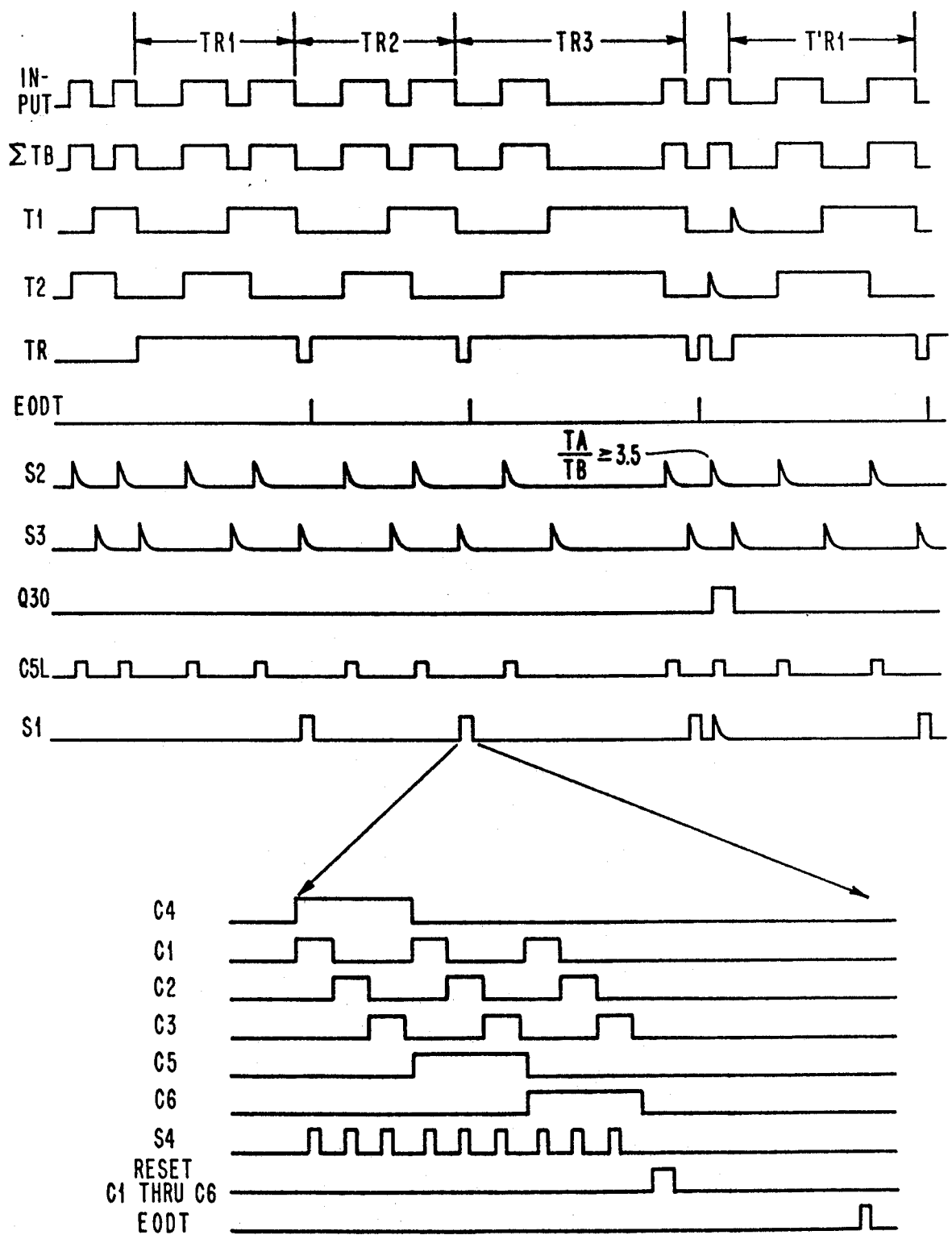
FIGS. 4–7 are block circuit diagrams of selected functional blocks of FIG. 3 in greater detail.

The novel circuit illustrated in FIG. 3 is capable of deriving the values N1, N2 and N3 without performing the arithmetic computations set forth above, thus reducing substantially the cost of a decoder suitable for decoding a UPC label. In FIG. 3 an input signal from a label scanner which is an electric analog of the scanned label is applied to a gate generator circuit 15 which provides gating signals TA, TB, T1, T2, TR and $\epsilon$TB. These signals are illustrated in FIG. 4 with the exception of TA and TB which are of opposite phase to T1 and T2, respectively. In addition, gate generator 15 provides three sampling signals S1, S2 and S3 which are illustrated in FIG. 4. The signals illustrated graphically in FIG. 4 are produced by the circuit illustrated in FIG. 5 which shows in greater detail the internal working of gate generator 15 and will be described later.

An oscillator 16 oscillating at frequency $f$ drives a frequency generator circuit 17 (e.g., a plurality of appropriately interconnected counters) to provide a plurality of outputs at the following frequencies $f$, $2.5/7f$, $3.5/7f$, $4.5/7f$, $3.5f$, $1/3.5 f$ and $1-1/7f$.

A clock signal generator 18 in response to sample signals S1 and S2 provides a plurality of sequential control signals C1, C2, C3, C4, C5, C5L, C6, S4 and EODT which are illustrated graphically in FIG. 4. Frequency generator 17 and clock signal generator 18 will not be described in greater detail since these are well known signal generating devices.

A counter/compare circuit 19 (illustrated in greater detail in FIG. 6) receives the illustrated inputs from generators 15, 17 and 18. The circuit includes a plurality of counters and storage units (shown in detail in FIG. 6 and described later in connection with the detailed description thereof). The counters are controlled by one or more of the gate signals supplied by generator 15 and count at the rate of one or more of the signals from generator 17. The control signals C1–C6 from generator 18 selectively switch the counted values to a comparator which compares the magnitudes of the counts and provides a clear output on a conductor 20 during one compare period and a plurality of sequential outputs on an output conductor 21 during a sequence of comparisons of selected counter values.

Figure 7:
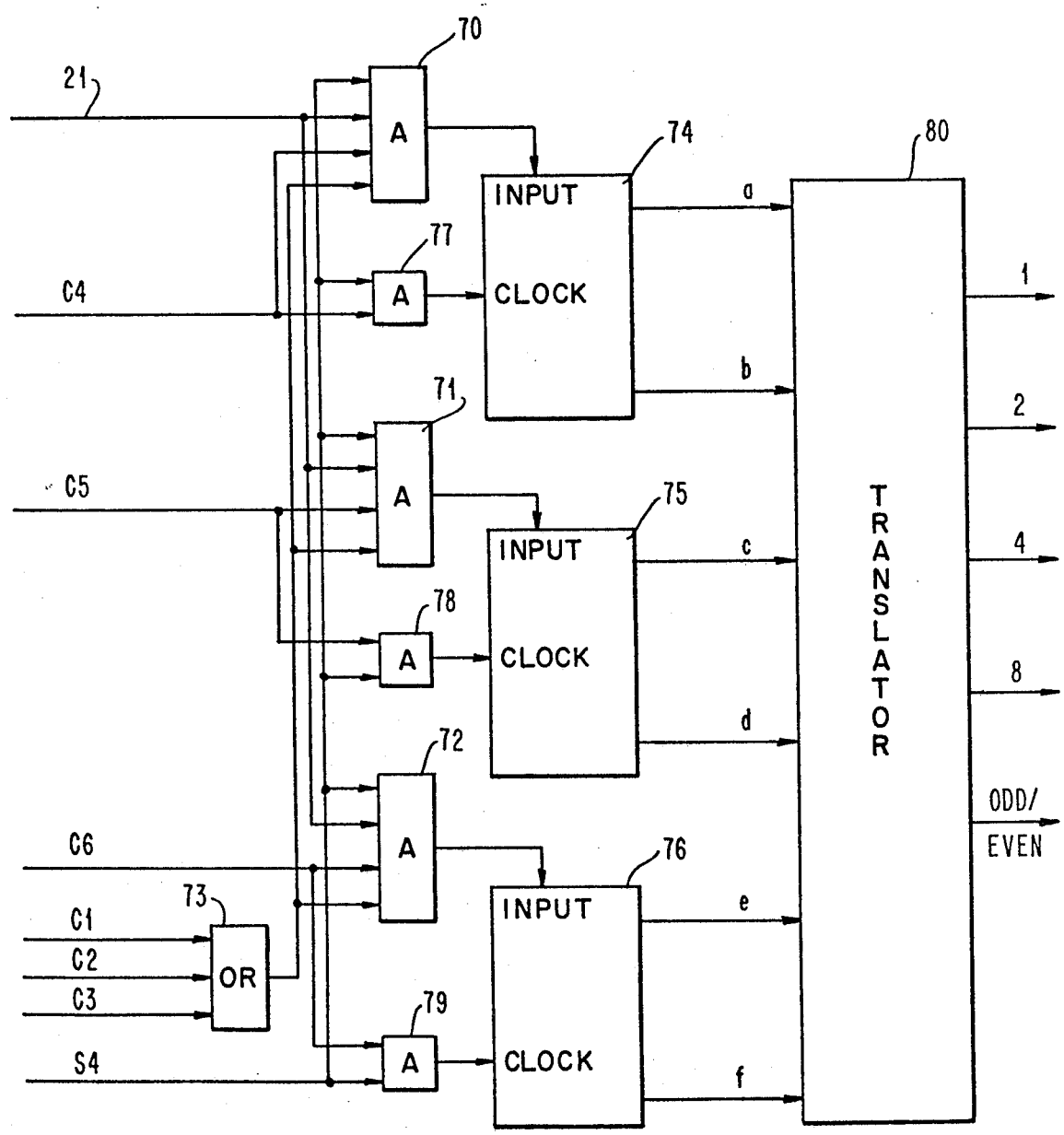

A decoder 22 shown in greater detail in FIG. 7 receives the output on conductor 21 as well as the outputs C1–C6 and S4 from generator 18 and S1 from generator 15 and provides a decoded output of the UPC characters on a sequential basis as scanned. The decoder output is connected to a multiple bit shift register 23 which is stepped by the EODT output from generator 18. The clear signal on line 20 is applied to the reset input of register 23 and clears or resets the register when the clear output, which indicates a label start, is generated thus clearing erroneous data out of register 23. A counter 24 is stepped by the TR output from generator 15 and reset by clear on conductor 20. When twelve TR's are counted without a reset (a complete UPC symbol or label) counter 24 develops an output which enables a gate 25 which passes the contents of register 23 to a utilization device.

Figure 5:
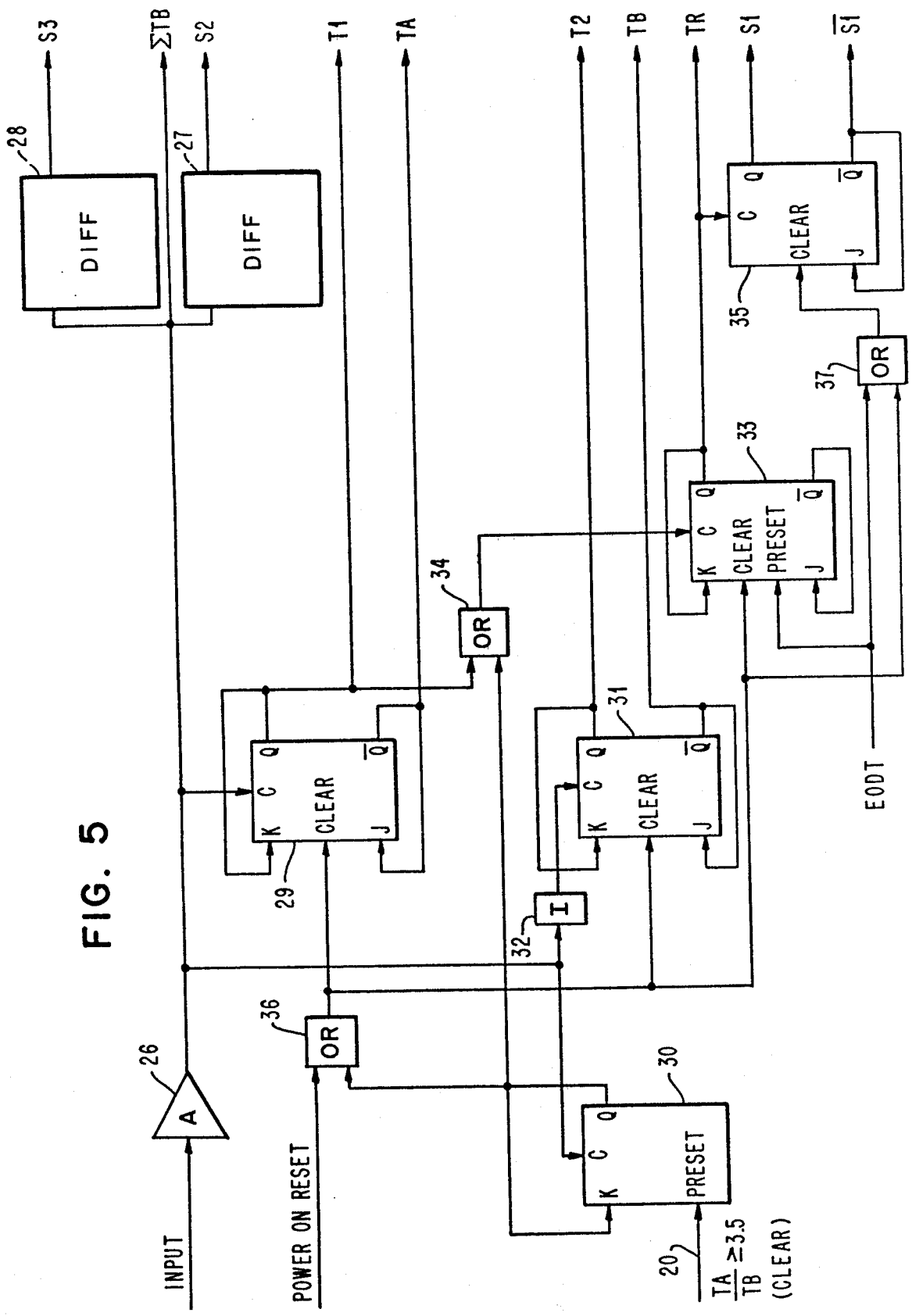

FIG. 5 is a detailed block circuit diagram of the gate generator 15 of FIG. 3. The input signal illustrated graphically in FIG. 4 is applied to an amplifier 26. The output from amplifier 26 is applied to first and second differentiating circuits 27 and 28 which provide outs S2 and S3, illustrated graphically in FIG. 4, and directly as the gating output $\epsilon$TB also illustrated in FIG. 4. In addition, the output of amplifier 26 is applied to the clock input of a flip-flop 29 (which may be industry standard type 7476 or equivalent). This flip-flop is connected to clock on a negative transition of the clock signal. The Q and $\overline{Q}$ outputs are directly connected to the K and J inputs, respectively, and provide the T1 and TA gate signals previously described. Only the T1 gate signal is illustrated in FIG. 4 since the TA signal is identical but shifted in phase by 180°.

The output of amplifier 26 is also applied to the clock input of a flip-flop 30 which is externally connected to turn off on a negative transition of the output of amplifier 26. The Q output of flip-flop 30 is directly connected to the K input and the "clear" signal from counter/compare circuit 19 is connected to the preset input and turns flip-flop 30 "on" when present. In addition, the output of amplifier 26 is connected to the clock input of another flip-flop 31 via an inverter 32. Flip-flop 31 is externally connected to turn "on" when the signal undergoes a negative transition which corresponds to a positive transition of the input signal due to the action of inverter 32. The Q and $\overline{Q}$ outputs of flip-flop 31 are connected to the K and J inputs, respectively, and provide the T2 and TB gate signals, respectively. Gate signal T2 is illustrated in FIG. 4. TB is not illustrated since it is the same except for a 180° phase shift.

A fourth flip-flop 33 has its clock input connected to the Q output of flip-flops 29 and 30 via an OR circuit 34 and is externally connected to clock on a negative transition of the Q outputs. The Q and $\overline{Q}$ outputs of flip-flop 33 are directly connected to the K and J inputs, respectively, and the Q output provides the TR gate signal illustrated in FIG. 4. The Q output is also connected to the clock input of a fifth flip-flop 35 which is externally connected to clock on a negative transition of the TR gate signal. The $\overline{Q}$ output of flip-flop 35 is connected to the J input and the Q and $\overline{Q}$ outputs provide the S1 and $\overline{S1}$ signals previously described. The S1 signal only is illustrated in FIG. 4 since the $\overline{S1}$ signal is the same but of opposite phase. Flip-flops 30, 31, 33 and 35 are the same as flip-flop 29 and may utilize 7476 J/K flip-flops or equivalent.

Flip-flops 29, 31, 33 and 35 are cleared (turned to the "off" state) by a power "on" reset signal via an OR circuit 36 and another OR circuit 37 in the case of flip-flop 35. The Q output of flip-flop 30 is also connected to OR circuit 36 and performs the same function when turned on by the clear signal from circuit 19, FIG. 3, which is applied to the preset input (which turns the flip-flop on). The end of decode time (EODT) from clock signal generator 18 is applied to the preset input of flip-flop 33 and turns 33 on when present. In addition, this signal is applied to the clear input of flip-flop 35 via the OR circuit 37 and turns 35 off when present.

The operation of the circuit of FIG. 5 is relatively straightforward. Negative transitions of the input signal turns 29 on or off causing T1 to go up or down depending on its prior state (see FIG. 4) while positive transitions of the input signal turns 31 on or off causing T2 to go up or down depending on its prior state (also see FIG. 4). Flip-flop 33 switches to the state on negative transitions of T1 and is preset to the "on" state at the end of decode time S1 by EODT which occurs a fixed time after decode S1 rises via clock signal generator 18. Flip-flop 35 is set on by the negative transitions of TR and turned off by EODT. In addition, all of the flip-flops (29, 31, 33 and 35) are cleared at power on and whenever the clear output from circuit 19 is applied to the preset input of flip-flop 30, thus assuring proper synchronization of the signals illustrated in FIG. 4. After flip-flop 30 turns on via a clear on conductor 20 from circuit 19, a subsequent negative transition of the input signal turns 30 off. When the Q output falls (negative transition) 33 turns on. This condition is illustrated in FIG. 4 at the point where the ratio T'A/T'B≧3.5 is indicated. When circuit 19 detects that the ratio of T'A/T'B≧3.5 an output is provided on conductor 20 to preset flip-flop 30 to the on state as described above. This produces the signal changes described above and illustrated in FIG. 4 since detection of this condition indicates that the previous information stored in shift register 23, if less than twelve characters have been stored, is not valid UPC label data. A new search for a label is instituted until the ratio T'A/T'B < 3.5, at which time the gate signals (T) appear as shown on the left side of FIG. 4 and continue till twelve characters have been scanned or the value 3.5 for T'A/T'B is equalled or exceeded.

FIG. 4 also includes graphical representations of the control signals C1–C6, S4 and reset pulses which control signals follow the fixed pattern illustrated in response to the S1 signal for all but C5L and the S2 signal for the C5L control signal.

Figure 6:
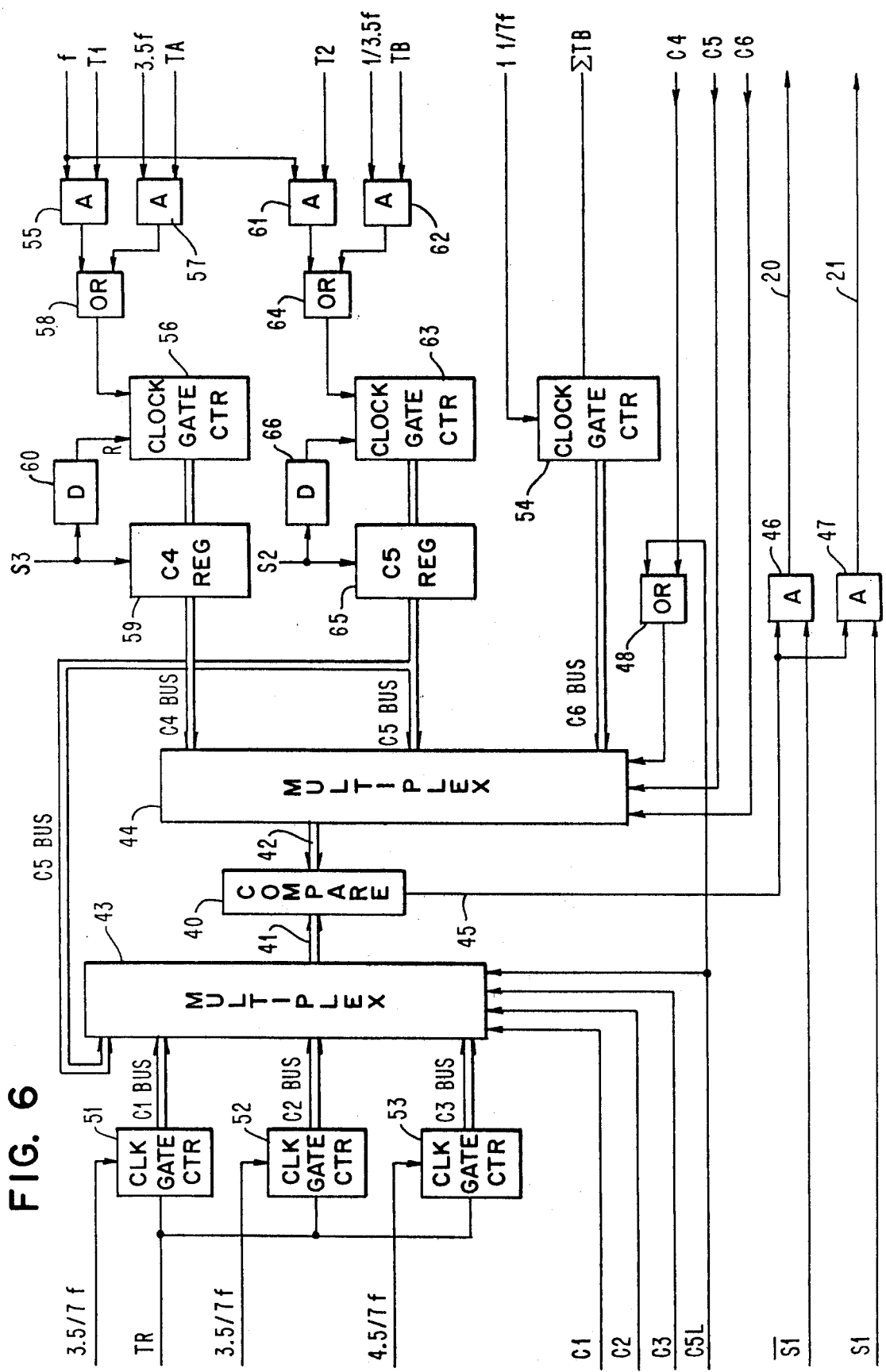

The signals described above from generators 15, 17 and 18 are applied to the circuit 19 as illustrated in FIG. 6 which is a detailed block diagram of the counter/compare circuits 19 of FIG. 3. In FIG. 6 a compare circuit 40 having two sets of inputs 41 and 42 is connected to a plurality of buses, which will be described later, by a multiplexing switch 43 which has its output connected to input 41 and by a multiplexing switch 44 which has its output connected to input 42. Comparator 40 provides an output on conductor 45 which is in a first state when input 41 is less than input 42 and an output which is in a second state when input 41 is equal to or greater than input 42. Conductor 45 is connected to output 20 by an AND gate 46 which is controlled by $\overline{S1}$ and to output 21 by an AND gate 47 which is controlled by S1. Switches 43 and 44 are not illustrated in greater detail since they are conventional well-known devices which in response to two or more unique control signals will connect one of a plurality of multiple inputs to a common output. The switching elements may, for example, include a gate for each line in each bus under control of the appropriate control signal and OR circuits for connecting appropriate gate outputs to the common output.

Control signals C1, C2, C3 and C5L are connected to switch 43. Control signals C4 and C5L are connected to switch 44 by an OR gate 48 and control signal C5 and C6 are directly connected to switch 44. Thus, when C1 is present, the contents of the C1 bus connected to switch 43 are available at the output of switch 43 which is connected to input 41 of compare circuit 40. Similarly, C2 switches the C2 bus to the switch output and C3 switches the C3 bus to the output. Control signal C5L switches the C5 bus to the output of switch 43 and the C4 bus to the output of switch 44 which output is connected to input 42 of comparator 40. Control signal C4 switches the C4 bus to the output of switch 44 and signals C5 and C6 switch buses C5 and C6, respectively, to the output of switch 44.

The TR gate signal from the Q output of flip-flop 33 is applied to the gate input of counters 51, 52 and 53 which count pulses during TR at frequencies 2.5/7$f$, 3.5/7$f$ and 4.5/7$f$, respectively. The output of counters 51, 52 and 53 are connected to buses C1, C2 and C3, respectively. The $\epsilon$TB signal from the output of amplifier 26 is applied to the gate input of a counter 54 which counts pulses at a frequency of 1-1/7$f$. The output of counter 54 is connected to the C6 bus. The T1 and TA gate signals from the Q and $\overline{Q}$ outputs of flip-flop 29 are mutually exclusive. The T1 gate signal is applied to an AND gate 55 and applies pulses at frequency $f$ to the clock input of a counter 56 which is enabled at all times during the T1 interval. The TA gate signal is applied to an AND gate 57 and applies pulses at a frequency 3.5$f$ to the clock input of counter 56. The pulses from gates 55 and 57 are applied to the clock input via an OR circuit 58. Under control of the S3 control signal the attained count in counter 56 is stored in a register 59. A delay circuit 60 resets counter 56 after the contents are transferred to register 59. The output of register 59 is connected to the C4 bus. Thus, counter 56 alternately counts at frequencies $f$ and 3.5$f$ and the previous count is stored in register 59 while the subsequent count is accumulated at the different frequency. Alternatively, two counters without a register arranged as those described above could have been used but at a higher hardware cost. The T2 and TB gate signals from the Q and $\overline{Q}$ outputs of flip-flop 31 are also mutually exclusive. These gate signals are applied to AND gates 61 and 62, respectively, and control the application of pulses at frequencies of $f$ and 1/3.5$f$ to the clock input of a counter 63 via an OR circuit 64. Counter 63, like counter 56, is continuously enabled. The output of counter 63 is connected to a register 65 and under control of the control signal S2, the attained count in counter 63 is transferred to register 65. A delay circuit 66 applies the signal S2 to the reset input of counter 63 after the attained count is transferred and the counter counts at the alternate frequency.

The compare circuit 40 of FIG. 6 provides different outputs on conductors 20 and 21 at different times and for different purposes. The output on conductor 20 during $\overline{S1}$ time indicates under certain conditions that previously buffered data is invalid. This output is used to reset the flip-flops 29, 31, 33 and 35, FIG. 3; reset counter 24 to zero and clear shift register 23 of previously accumulated invalid data. The comparison which results in this action occurs any time T'A/T'B ≧ 3.5. For the purposes of time sharing the circuits this determination is made on a continuing basis under control of C5L which compares the stored contents of registers 59 and 65. The comparisons are TB at 1/3.5$f$ vs. T1 at $f$ alternated with T2 at $f$ vs. TA at 3.5$f$. When TA at 3.5$f$ or T1 at $f$ are equal to or greater than T2 at $f$ or TB at 1/3.5$f$, respectively, the condition T'A/T'B ≧3.5 prevails and comparator 40 generates a signal which via AND gate 46 and conductor 20 resets all circuits as previously described. This is true since:

$$\frac{T1}{TB} : \frac{\frac{f}{1}}{3.5F} : \frac{3.5}{1} \text{ and}$$

$$\frac{TA}{TZ} : \frac{3.5F}{F} : \frac{3.5}{1} \text{ or if;}$$
$$C4 \geqq C5 \text{ then } K \geqq 3.5.$$

By allowing counters 56 and 62 to count at a speed of $f$ during the T1 and T2 times, respectively, the information accumulated is also available for the decoding operation which takes place during S1 time.

During S1 time under control of C1, C2, C3, C4, C5 and C6, the accumulated count at the indicated frequencies of counters S1, S2 and S3 are compared sequentially to the accumulated counts of registers S9 and C5 and counter S4, thus providing nine sequential binary bits of information which uniquely define the coded character just scanned. These nine binary bits are applied to the decoder 22 via AND gate 47 and conductor 21 which also receives C1–C6 and S4 from clock signal generator 18.

Decoder 22 is illustrated in greater detail in FIG. 7. The output from AND gate 47 in conductor 21 is applied to three AND gates 70, 71 and 72. The control signals C1, C2 and C3 are applied to an OR circuit 73 which has its output connected to gates 70–72. The sample pulses S4 from generator 18 (also see FIG. 4) are also applied to gates 70–72. Control signals C4, C5 and C6 are applied to gates 70, 71 and 72, respectively. Thus, during C4 time the results of the three comparisons are applied via gate 70 to a two-bit binary counter 74 which has two outputs $a$ and $b$. During C5 time the results of the three comparisons conducted are applied to a second two-bit binary counter 75 via AND gate 71 and during C6 time the results of the three comparisons are applied to a third two-bit binary counter 76. Three AND gates 77, 78 and 79 under control of C4, C5 and C6, respectively, apply sample pulses S4 to the clock inputs of counters 74, 75 and 76, respectively. The outputs $a$ and $b$ of counter 74, $c$ and $d$ of counter 75 and $e$ and $f$ of counter 76 are connected to a translator 80 which provides a parallel binary output identifying the character applied and decoded. Translator 80 may typically include a read-only memory (ROM) which is addressed by the $a$–$f$ outputs of counters 74–76 to thus provide the desired binary coded output.

As described above, the sequential binary codes are shifted into register 23 until a complete label has been decoded which condition is indicated by the state of counter 24.

Table I below is a truth table for counters 74, 75 and 76 which defines the state of the counters for the comparisons made during C4, C5 and C6 and given the nominal length for the bar length or width conditions detected and the state of outputs $(a,b)$, $(c,d)$ and $(e,f)$. Table II shows in tabular form the decimal values for both odd and even parity UPC characters for the various values of the counter outputs $a$–$f$. In those instances where an X is used in the table, either 1 or 0 may be present without an effect on the decode (e.g., don't care).

Truth table for counters 74 (T1), 75 (T2), 76 ($\epsilon$TB)

TABLE I

| Nominal Length | Bar Length Conditions | Counter Bit b | Bit a |
|---|---|---|---|
| 2 | $7\frac{T1}{TR} < 2.5$ | 0 | 0 |
| 3 | $2.5 \leqq 7\frac{T1}{TR} < 3.5$ | 0 | 1 |
| 4 | $3.5 \leqq 7\frac{T1}{TR} < 4.5$ | 1 | 0 |
| 5 | $4.5 \leqq 7\frac{T1}{TR}$ | 1 | 1 |
| Nominal Length | Bar Length Conditions | Counter Bit d | Bit c |
| 2 | $7\frac{T2}{TR} < 2.5$ | 0 | 0 |
| 3 | $2.5 \leqq 7\frac{TZ}{TR} < 3.5$ | 0 | 1 |
| 4 | $3.5 \leqq 7\frac{T2}{TR} < 4.5$ | 1 | 0 |
| 5 | $4.5 \leqq 7\frac{T2}{TR}$ | 1 | 1 |
| Nominal Length | Bar Width Conditions | Counter Bit f | bit e |
|  | $7\frac{TB}{TR} < \frac{8}{7} \times 2.5$ | 0 | 0 |
|  | $\frac{8}{7} \times 2.5 \leqq 7\frac{TB}{Tr} < \frac{8}{7} \times 3.5$ | 0 | 1 |
| 2 | $\frac{8}{7} \times 3.5 \leqq 7\frac{TB}{TR} < \frac{8}{7} \times 4.5$ | 1 | 0 |
| 3 | $\frac{8}{7} \times 4.5 \leqq 7\frac{TB}{TR}$ | 1 | 1 |

TABLE II

| Odd UPC Values Decimal | f | e | d | c | b | a |
|---|---|---|---|---|---|---|
|  | 0 | 0 | 1 | 0 | 0 | 1 |
| 1 | 0 | 1 | 1 | 0 | 0 | 1 |
|  | 1 | 0 | 1 | 0 | 0 | 1 |
|  | 0 | 0 | 0 | 1 | 1 | 0 |
| 2 | 0 | 1 | 0 | 1 | 1 | 0 |
|  | 1 | 0 | 0 | 1 | 1 | 0 |
| 3 | X | X | 1 | 1 | 0 | 0 |
| 4 | X | X | 1 | 0 | 1 | 1 |
| 5 | X | X | 1 | 1 | 1 | 0 |
| 6 | X | X | 0 | 0 | 1 | 1 |
| 7 | 1 | 1 | 1 | 0 | 0 | 1 |
| 8 | 1 | 1 | 0 | 1 | 1 | 0 |
| 9 | X | X | 0 | 0 | 0 | 1 |
| 0 | X | X | 0 | 1 | 1 | 1 |
| Even UPC Values Decimal | f | e | d | c | b | a |
| 1 | 1 | 0 | 1 | 0 | 1 | 0 |
|  | 1 | 1 | 0 | 1 | 0 | 1 |
| 2 | 1 | 0 | 0 | 1 | 0 | 1 |
|  | 1 | 1 | 0 | 1 | 0 | 1 |

TABLE II-continued

| | | | | | | |
|---|---|---|---|---|---|---|
| 3 | X | X | 1 | 0 | 0 | 0 |
| 4 | X | X | 1 | 0 | 0 | 0 |
| 5 | X | X | 1 | 1 | 0 | 1 |
| 6 | X | X | 0 | 0 | 0 | 0 |
| 7 | 0 | 0 | 1 | 0 | 1 | 0 |
| | 0 | 1 | 1 | 0 | 1 | 0 |
| 8 | 0 | 0 | 0 | 1 | 0 | 1 |
| | 0 | 1 | 0 | 1 | 0 | 1 |
| 9 | X | X | 0 | 0 | 1 | 0 |
| 0 | X | X | 0 | 1 | 1 | 1 |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A method for decoding electric signals corresponding to bar coded data and generated when a bar coded label is scanned by an electro-optic scanner which provides a coded electric pulse-like signal train which is an analog of the bar coded label comprising the steps of:

generating a plurality of gating signals each of which is a different function of selected transitions in the signal provided by the scanner;

generating a plurality of pulse trains each at a different frequency;

counting selected pulses during each of said gate signals;

comparing in a predetermined sequence the counts attained during the gate periods to determine the relative magnitude of the compared counts; and, storing one binary state when the results of the comparison indicate one relationship and the other binary state when the results of the comparison are opposite whereby the stored binary states categorize the coded information on the label.

2. The method set forth in claim 1 in which:

said plurality of gate signals generated include; a first gate signal TR which coincides with those transitions delimiting a complete character, a second gate signal T1 extending in time between the first and last negative signal transitions within a character, a third gate signal T2 extending in time between the first and last positive signal transition within a character, and a fourth gate $\epsilon$TB extending in time between all positive and negative transitions of the signal within a character;

said plurality of pulse trains generated include; first through fifth frequencies;

said counting includes; counting said first, second and third frequencies during the presence of TR, said fourth frequency during T1 and T2, and said fifth frequency during $\epsilon$TB; and, said comparison includes comparing the counts at the first, second and third frequencies during TR in sequence with the counts accumulated during T1, T2 and $\epsilon$TB.

3. The method set forth in claim 2 in which said first through fifth frequencies are, respectively, 2.5/7 $f$, 3.5/7 $f$, 4.5/7 $f$, $f$ and 8/7 $f$ where $f$ is an arbitrarily selected value which may vary over a substantial range.

4. A decoder for decoding pulse-like electric signals which are an analog of an optically bar coded label and produced when the label is scanned by a scanner comprising:

first circuit means responsive to the pulse-like electric signals which are an analog of the optically bar coded label for providing a plurality of gating signals each of which is a different function of selected transitions in the said pulse-like signals;

second circuit means for generating and providing a plurality of pulse-like signal trains each at different frequencies;

third circuit means responsive to said first and second circuit means for counting selected pulses included in the pulse trains under control of the said gates;

fourth circuit means for comparing in a predetermined sequence the counts attained under control of the said gates to determine the relative magnitude of the compared counts and for providing a first output signal when the relative magnitude of the compared counts have one relationship and second output signal when the relative magnitudes of the compared counts have an opposite relationship; and, decoder means responsive to the said first and second output signals from the said fourth circuit means for providing a binary coded output indicative of the information represented in the pulse-like signal which is an analog of the optical bar coded label.

5. A decoder as set forth in claim 4 in which:

the gate signals provided by said first circuit means include; a first gate signal TR which coincides with those transitions in the said electric signals which delineate a complete character, a second gate signal T1 which extends in time between the first and last negative signal transition within a character, a third gate signal T2 which extends in time between the first and last positive signal transition within a character, and a fourth gate signal TB which extends in time between all positive and following negative transitions of the signal within a character;

the said second circuit means provides first through fifth different frequency pulse-like signal trains;

the said third circuit means counting said first, second and third frequency pulse trains separately under control of TR, said fourth pulse train separately under control of T1 and T2; and said fifth pulse train under control of $\epsilon$TB; and, the said fourth circuit means comparing in sequence the accumulated count of the first, second and third pulse trains with each of the accumulated counts of the fourth pulse train under control of T1 and under control of T2 and the fifth pulse train under control of $\epsilon$TB.

6. A decoder as set forth in claim 5 in which the said first through fifth pulse-like trains provided by said third circuit means have the following frequencies, respectively; 2.5/7 $f$, 3.5/7 $f$, 4.5/7 $f$, $f$ and 8/7 $f$ where $f$ is an arbitrarily selected value which may vary over a substantial range.

7. A decoder as set forth in claim 6 in which said fourth circuit means includes:

first, second and third counter means for counting the first, second and third pulse-like trains under control of the TR gate signal;

fourth counter means for counting said fourth pulse-like train under control of the T1 gate signal;

fifth counter means for counting said fourth pulse-like signal train under control of the T2 gate signal;

sixth counter means for counting said fifth pulse-like signal train under control of the said εTB gate signal; and, a comparator circuit means having a first selectively operated gate means for gating the accumulated contents of the first, second and third counter means to a first comparator circuit means input, a second selectively operated gate means for selectively gating the accumulated contents of the fourth, fifth and sixth counter means to a second comparator circuit means input whereby the comparator circuit performs in sequence the comparisons set forth above and provides the above described sequential output to the said decoder means.

* * * * *